(12) United States Patent
Sorensen (10) Patent No.: US 6,520,073 B1
(45) Date of Patent: Feb. 18, 2003

(54) MOISTURE REDUCTION PRESS

(75) Inventor: Freddy Sorensen, Hjorring (DK)

(73) Assignee: J. S. Maskinfabrik A/S, Hjorring (DK)

( * ) Notice: Subject to any disclaimer, the term of this patent is extended or adjusted under 35 U.S.C. 154(b) by 0 days.

(21) Appl. No.: 09/380,365

(22) PCT Filed: Feb. 27, 1998

(86) PCT No.: PCT/DK98/00077

§ 371 (c)(1),
(2), (4) Date: Nov. 12, 1999

(87) PCT Pub. No.: WO98/39153

PCT Pub. Date: Sep. 11, 1998

(30) Foreign Application Priority Data

Mar. 4, 1997 (DK) ................................. 0234/97

(51) Int. Cl.$^7$ ............................... B30B 9/02; B30B 9/12
(52) U.S. Cl. ..................... 100/37; 100/111; 100/112; 100/117; 100/148
(58) Field of Search ................. 100/37, 110, 111, 100/112, 116, 117, 126, 127, 148

(56) References Cited

U.S. PATENT DOCUMENTS

| | | | | |
|---|---|---|---|---|
| 3,093,065 A | * | 6/1963 | French | 100/127 |
| 3,478,679 A | * | 11/1969 | Bauserman | 100/117 |
| 3,587,450 A | * | 6/1971 | Smith | 100/117 |
| 3,998,148 A | * | 12/1976 | Mainka et al. | 100/117 |
| 4,287,058 A | * | 9/1981 | Larsen | 100/117 |
| 4,304,054 A | * | 12/1981 | Nauck | 100/117 |
| 4,440,076 A | * | 4/1984 | Mansfield | 100/117 |
| 4,467,717 A | * | 8/1984 | Yamamoto | 100/117 |
| 4,520,724 A | * | 6/1985 | Costarelli | 100/117 |
| 4,581,992 A | * | 4/1986 | Koch | 100/117 |
| 4,705,055 A | * | 11/1987 | Rohm et al. | 100/117 |
| 4,974,506 A | | 12/1990 | Lührs | |
| 4,997,578 A | * | 3/1991 | Berggren | 100/117 |
| 5,061,366 A | * | 10/1991 | Arai | 100/117 |
| 5,118,427 A | * | 6/1992 | Eichler | |
| 5,489,383 A | * | 2/1996 | Yoshikawa | 100/117 |
| 5,515,776 A | | 5/1996 | Scheucher | |
| 5,638,745 A | * | 6/1997 | Lokhandwala et al. | 100/117 |
| 5,662,035 A | * | 9/1997 | Lee | 100/127 |

FOREIGN PATENT DOCUMENTS

| | | |
|---|---|---|
| DE | 842 161 | 6/1952 |
| DE | 906 538 | 3/1954 |
| DE | 2 055 547 | 5/1972 |
| EP | 0 553 783 | 8/1993 |
| FR | 593 115 | 8/1925 |
| FR | 1 241 225 | 8/1960 |
| FR | 2 036 597 | 12/1970 |
| JP | 61-259897 | 11/1986 |
| NO | 144201 | 4/1981 |
| NO | 150873 | 9/1984 |
| SE | 358 686 | 8/1973 |
| WO | WO 96/08364 | 3/1996 |

* cited by examiner

*Primary Examiner*—John Sipos
*Assistant Examiner*—Louis Huynh
(74) *Attorney, Agent, or Firm*—Lee, Mann, Smith, Mc Williams, Sweeney & Ohlson (57) ABSTRACT

Moisture reduction press for the separation of liquid from substances, comprising a first container with an inlet opening through which the substance is fed to an inlet chamber, and with a discharge opening from an outlet chamber through which the moisture-reduced substance leaves the press, and also where inside the first container there is arranged a second container, so that between the surface of the first container and the outer surface of the second container a passageway is formed. The moisture reduction press further comprises means for building up a pressure at least in the passageway and feed the substance forward, and in that the wall of the first container, preferably for the whole of its periphery and at least between the two chambers, is produced with through-going holes. There is hereby achieved a uniform distribution and pressing of the substance to be drained, regardless of the moisture content in the substance. Moreover, the process is effected continuously and without any risk of stoppages taking place.

8 Claims, 7 Drawing Sheets

MOISTURE REDUCTION PRESS

BACKGROUND OF THE INVENTION

The invention concerns a moisture reduction press for the separation of liquid from substances, comprising at least a first container with an inlet opening through which the substance is fed to an inlet chamber, and with an discharge opening from an outlet chamber through which the liquid-reduced substance leaves the press, that inside the first container there is disposed at least one second container so that between the surface of the first container and the outer surface of the second container there is formed a passageway, that the moisture reduction press comprises a valve/throttle provided at the discharge opening/outlet chamber and a pump unit provided at the inlet opening which valve/throttle and pump units build up a pressure at least in the passageway.

Such a moisture reduction press is known, partly for example from U.S. Pat. No. 3,982,483. The reduction press disclosed in this publication consists of a chamber in which there is provided a rotating worm-blade which, among other things, surrounds a cone. The press functions by leading the substance into a container via a form of drive and, as a consequence of the rotation of the wormblade, a feeding forward of the substance takes place. The cone will press the substance out towards the periphery of the container, and by this movement the moisture from the substance is pressed out.

The system suffers the disadvantage that the moisture can be pressed out solely as a result of the space between the cone and wall being reduced during the forward movement of the substance. There hereby arises a risk of stoppage, and the movement will also be disrupted so that the substance will not be fed forward.

Furthermore, the size of the cone must be selected in relation to the degree of moisture in the substance. In other words, this means that if the substance has a moistness which is not suitable for the relevant cone, the machinery will not function in an optimum manner, and in the worst case there will not occur any draining-off of the material.

From EP-A-0 553 783 a screw type hydroextractor is known. The screw type has the disadvantage that when for instance sludge is discharged into the first cylindrical casing the draining takes place during a press process where the material is gradually compressed and squeezed from the screw vane, i.e. dehydrating is a function of the screw vane, and it is not possible to build up a certain pressure, and it is not possible to control the draining during the draining process.

JP A 61-259 897 discloses a screw conveyor suitable for dehydrating substances. However, the construction is so that the pressure is only partly obtained from a valve and by regulating the valve at the outlet opening and pump units at the inlet opening. The rest of the pressure is obtained from the screw itself. In this way a pressure between the screw and the valve will change progressively so that the pressure at the beginning of the dehydrating process will be much smaller than that at the end. Therefore, the construction is not suitable for lumpy and viscous material since there will be a risk of hindering the movement of the screw. Secondly, since there are only small areas with through-going passages for dehydrating the substances the pump will not be very effective.

SUMMARY OF THE INVENTION

It is the object of the present invention to provide a moisture reduction press which is not encumbered with the disadvantages of the known systems. This object is achieved with a moisture reduction press of the kind disclosed in the introduction and where the wall of at least the one container, essentially for the whole of its circumference and at least between the two chambers, is produced with through-going passages and that the substances via the inlet opening is pressed into the passageway between the first and the second container and that the wall of the first and/or the second container, and which is relatively movable in relation to a scraper arrangement, is provided with the through-going passages. An optimization of the draining-off area is achieved, while at the same time sticky material is removed from the wall so that a stoppage is avoided.

There is hereby achieved a uniform distribution and pressing of the substance, and where the draining-off of this is not dependent on the moisture content, in that the system will function optimally regardless of the moisture percentage. Moreover, at the same time it is achieved that a draining-off and a continuous feeding forward of the substance takes place without any risk of this feeding forward being stopped.

The manner in which the moisture reduction press works is that the substance is pumped via the inlet opening into the container itself, and will be led out to the passages lying between the surfaces of the inner and the outer container, and which form an annular passageway. A regulator for the pressure in the press is provided in the other end of the press. There is now built up a suitable pressure at the same time that the material continues to be pumped in. When the desired pressure has been reached, the valve/throttle at the other end is opened so that a continuous discharge of the material takes place, during which discharge a simultaneous draining-off of the material occurs as a consequence of a pressure having been built up in the container. The important parameters for the system are namely the press pressure, the flow and time being controlled and regulated individually, and where flow and pressure are mutually dependent on one another the possibility is achieved of being able to control those of the process parameters which are of significance for the finished result, i.e. an optimum regulation of the press pressure which is built up, the regulation of the time for which the material is present in the container, plus a regulation of the flow which takes place. The process can, however, also be a pulsating continuous process, which is achieved by the valve/throttle being opened/closed intermittently.

BRIEF DESCRIPTION OF THE DRAWINGS

By providing a moisture reduction press, it is achieved that the material is not pressed the easiest way through the press, which would give rise to the risk that only a part of the straining area is utilized. Moreover, a cleaning of the sieve is effected, so that this is held clean. Furthermore, the scrapers can serve to transport the material, especially if these are formed as worm blading, and finally the scrapers make it possible to empty the press when this has finished, and thus make the cleaning process easier.

By providing a moisture reduction press according to the invention, an expedient configuration of the movable parts of the press is achieved.

By providing a moisture reduction press, the possibility is achieved of leading the substance in the direction towards the discharge opening whenever this may be necessary.

By providing a moisture reduction press according to the invention, an optimization of the scraping-off effect of the scrapers is achieved, which can be particularly expedient in connection with substances which have a certain adhesive character, and for example also in connection with extremely greasy material.

By providing a moisture reduction press according to the invention, the possibility is achieved of accelerating the draining process when and underpressure is applied to the jacket.

The invention also concerns a method for the draining-off of the substance. material.

The invention will now be described in more detail with reference to the drawing, where.

DETAILED DESCRIPTION OF THE DRAWINGS

Figure 1:
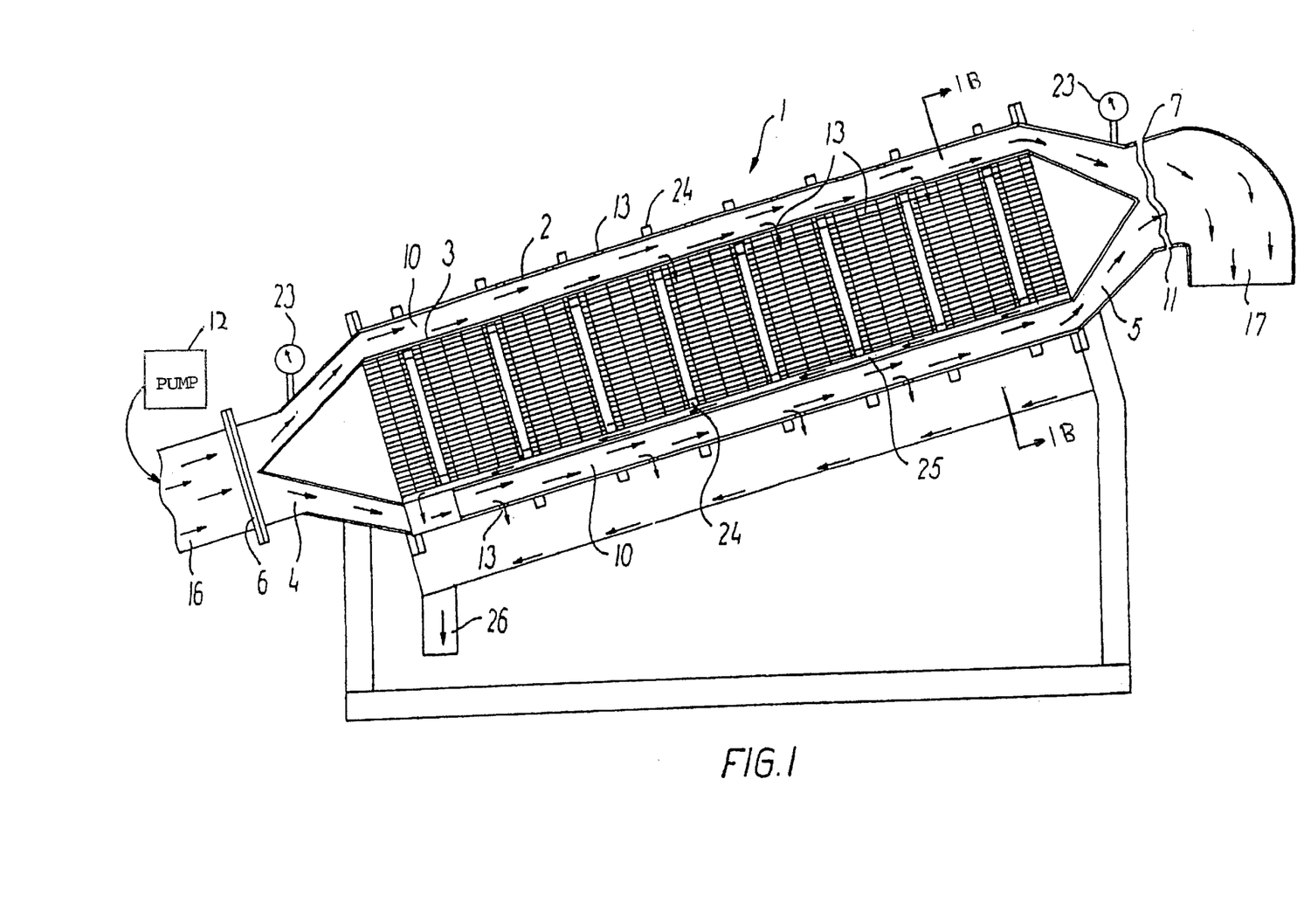
FIG. 1 shows a moisture reduction press configured with a first outer container inside which a second inner container is inserted.

FIG. 1 shows a moisture reduction press 1 configured with a first container 2 and a second container 3 arranged inside said first container 2. At least one of the walls of the containers is provided with through-going passages 13. These passages can be brought about by using a perforated plate or sieve or possibly other means for the passage of the moisture which is pressed out when the substance is led into the first container 2. Both the first and the second container can be provided with annular stiffeners 24 for stabilizing the construction.

At the inlet end of the construction there is an inlet pipe 16 which extends over into an inlet opening 6 which continues to the inlet chamber 4, from which there is further extension to the annular passageway 10 which is formed between the first and the second container. Both the first and the second container are preferably cylindrical in shape, and the centre axes of the containers are coincident. The second container 3 is thus placed concentrically in the first container 2.

Mounted in connection with the inlet opening 6/inlet chamber 4, there is a pump 12 which serves to pump in the substance from which moisture is to be drained. Opposite this end there is the outlet chamber 5 which, via a discharge opening 7, allows the substance to pass to the discharge pipe 17. In connection with the discharge opening 7 and the outlet chamber 5 there is mounted a valve/throttle 11 which regulates the pressure and the flow of substance through the moisture reduction press 1. The pressure can possibly be regulated by the introduction of a compressive force.

When material is pumped in via the inlet opening 6, a filling-up of the annular passageway 10 takes place and the substance is thus evenly distributed. The pressure is regulated to a suitable level via the valve in the discharge opening. The draining-off is thus a result of the build up of pressure which occurs. The liquid which is pressed out of the substance finds its way through passages 13, preferably in the form of through-going holes and slots of various shapes and sizes, and which are either in the wall of the first or the second container or in both, all depending on how large a draining-off area is at disposal in relation to the consistency of the substance. If the liquid passes via the passages 13 to the inside of the second container, in this there will be arranged some inner draining pipes 25 from which liquid is collected via a further draining pipe for discharge via the draining-off pipe stub 26.

If the liquid leaves the substance via the possible passages 13 of the first container 2 through the wall, there are here formed draining pipes 25 which collect the drained liquid. The shown construction is suitable for draining substances which are not too sticky and thus do not become fixed to the walls and prevent a further draining-off.

Figure 1B:
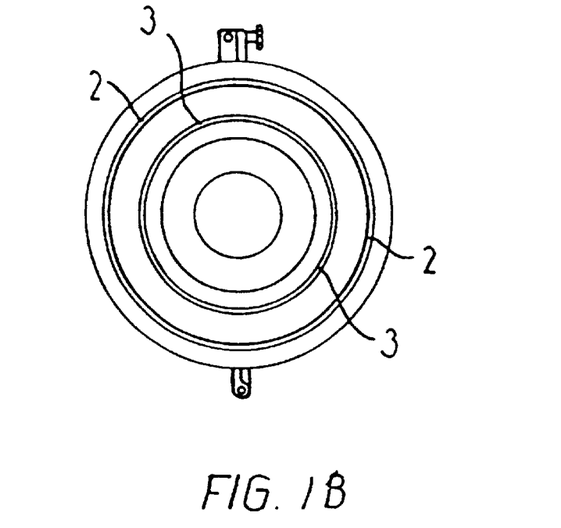
FIG. 1b shows the moisture reduction press in FIG. 1 shown in cross section in the direction 1B—1B.

FIG. 1b shows how the containers can be separated via a mid-section with hinge, and thus provide the possibility for the cleaning of the inside of the moisture reduction press. It is not a precondition for the function of the machine that it can be separated, but this can be an advantage e.g. with processes having strict hygienic requirements.

Figure 2:
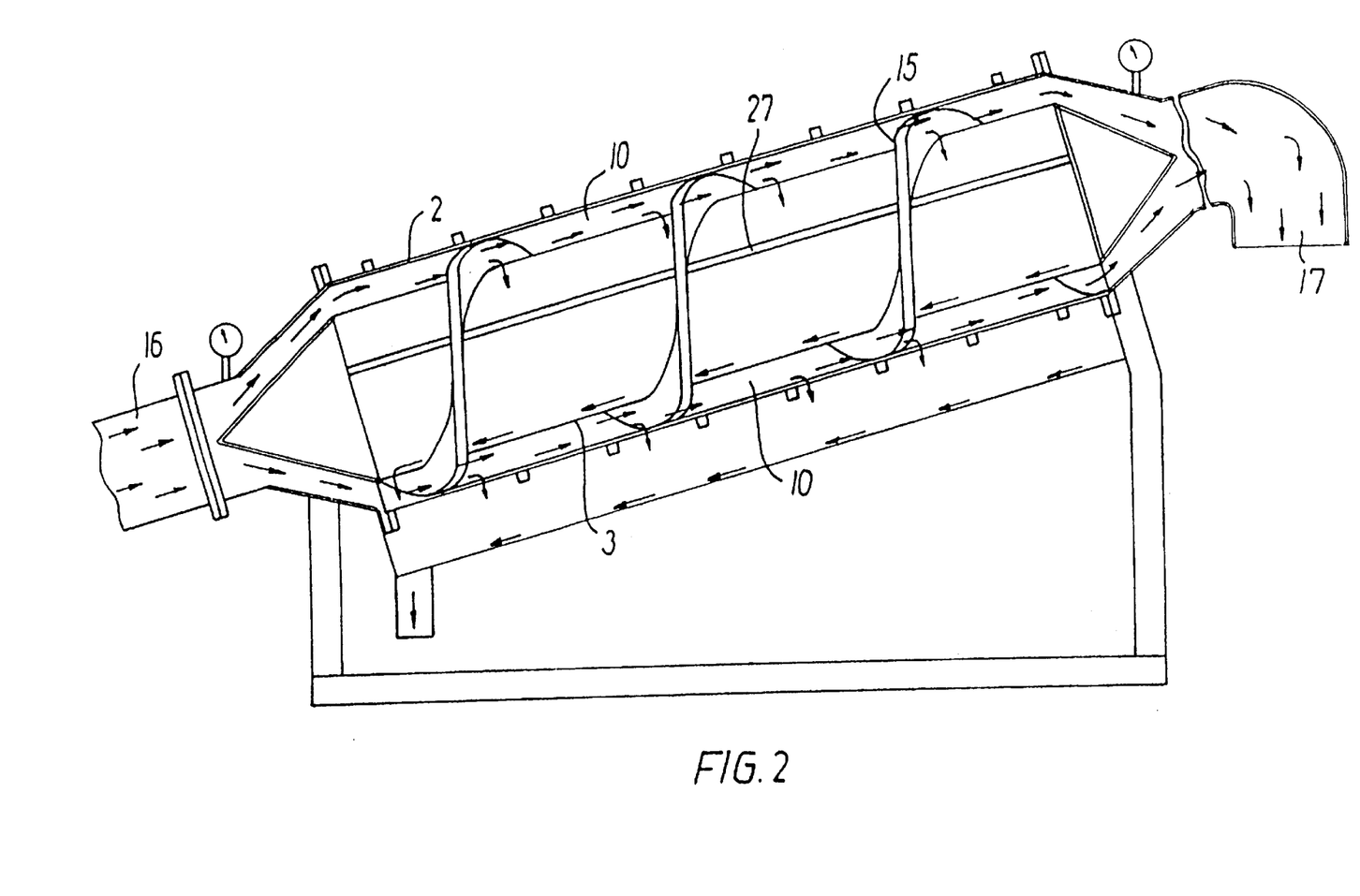
FIG. 2 shows a moisture reduction press which, in principle, is configured in the same way as that in FIG. 1, but where the second container is also provided with worm blading.

In principle, the moisture reduction press 1 in FIG. 2 is configured in the same way as that in FIG. 1, but here there is also mounted a scraper arrangement 14 in the form of worm blading 15. In order for the scrapers to have any function, some form of rotation must take place. This rotation can be provided by fastening the scrapers in the form of worm blading 15 to the second container 3, which thus rotates. In such a case the first container 2 will be provided with passages through which the liquid can penetrate. Upon rotation, a feeding forward of the substance will occur, while at the same time a cleaning of the inner surfaces of the first container 2 is effected, in that during its function the scraper is in contact with the surface.

A second possibility is that the worm blading itself is rotated, and thus where both the first and the second containers 2, 3 are stationary. In this case, both of the containers will be produced with walls in which there are through-going passages 13, so that the scraping against the wall surfaces serves a useful purpose. With the latter construction, an optimization of the effect of the worm blading is achieved and also an optimization of the drainage area.

In conclusion, there is also the possibility that both containers, i.e. the first and the second containers 2, 3, are turned, while the worm blading 15 itself remains stationary. Also in this case, both the first and the second container will be produced with walls which have through-going passages 13. It can be expedient for the worm bladings 15 to be further connected with each other by means of a longitudinal stiffener 27. Also, at the edges which have contact either with the first and/or the second container, the scrapers can be provided with a form of coating, e.g. elastomer.

Figure 3:
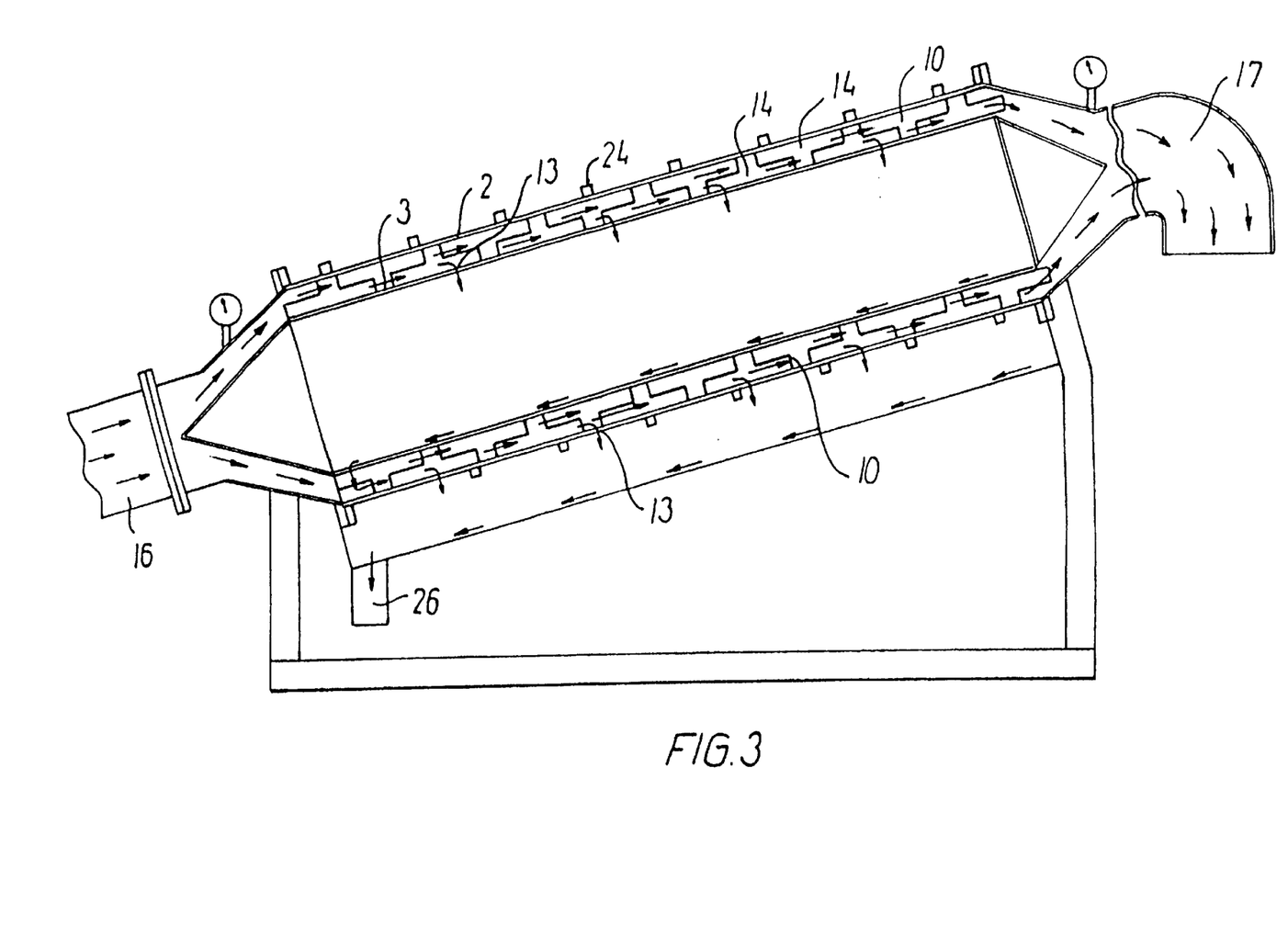
FIG. 3 shows a moisture reduction press which, in principle, is configured in the same way as that shown in FIG. 1, but where scrapers are mounted on both the inner and the outer container.

FIG. 3 shows a third example embodiment of a moisture reduction press 1, which in principle is built up in the same way as that shown in FIG. 1, but where scraper arrangements 14 are mounted on both the first as well as the second container 2, 3. By mounting scrapers on both containers, there is again achieved an optimization of the scraper effect.

In such cases, at least one of the containers will be rotating, possibly both, but in such cases contra-rotating, alternatively rotating in the same direction, but with relative different speed. If it is determined that scrapers are to be mounted only on the one container, it is important that the surface which is scraped is provided with passages 13 so that the liquid can escape through these passages. In this case, both the first and the second container 2, 3 will be made of a material with through-going passages 13.

Figure 4:
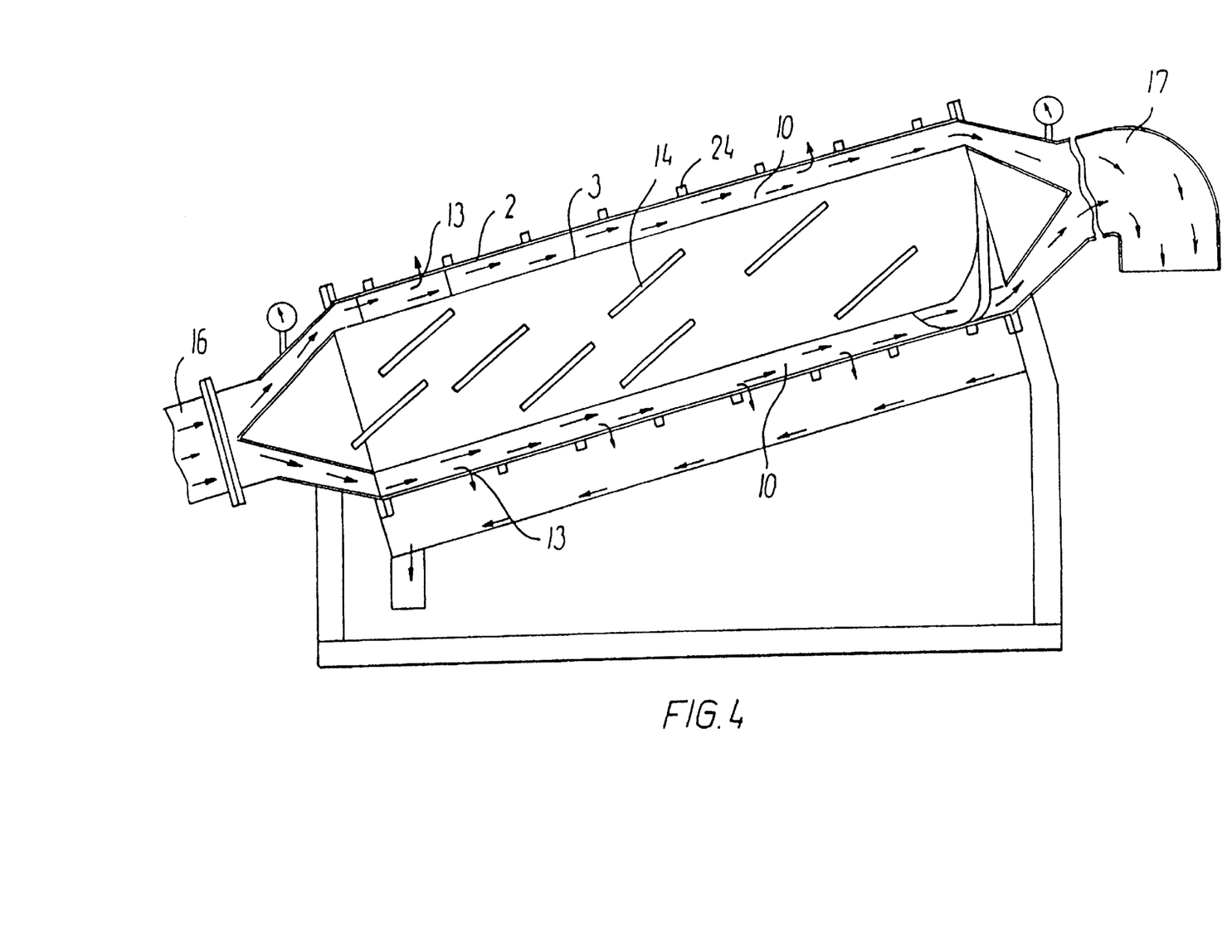
FIG. 4 shows a moisture reduction press which, in principle, is configured in the same way as that shown in FIG. 1, but where scrapers in the form of separate and separable plate pieces are mounted on the second container, FIGS. 5a and b show an example of an outlet valve where both pressure and flow are regulated.

FIG. 4 shows a fourth way in which the moisture reduction press can be configured, in that here the scraper arrangements 14 are made as small plate pieces which are mounted on the second container 3, from which they extend out at right-angles and have a scraping surface in contact against the first container 2. In the case envisaged here, one of the containers will be stationary and the other will be rotating. It is preferable to select the second container 3 to be made rotatable. Since the scraper arrangement 14 has the possibility of scraping only the one surface on the containers, it is exclusively this surface which is provided with passages. If the other wall were to be provided with passages, a problem would arise in that it would be expected that, with time, an accumulation of the substances would occur in these holes without the possibility of being able to remove it, in that there would not exist any scrapers for its removal.

Figure 5A:
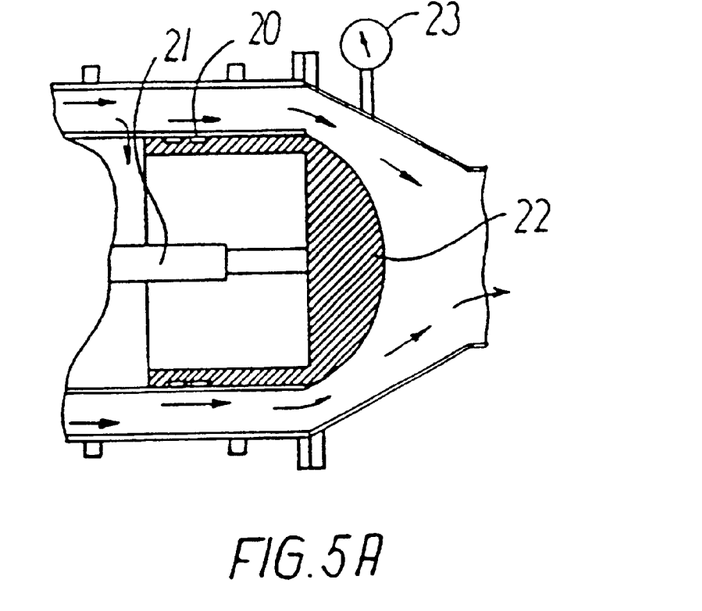
Figure 5B:
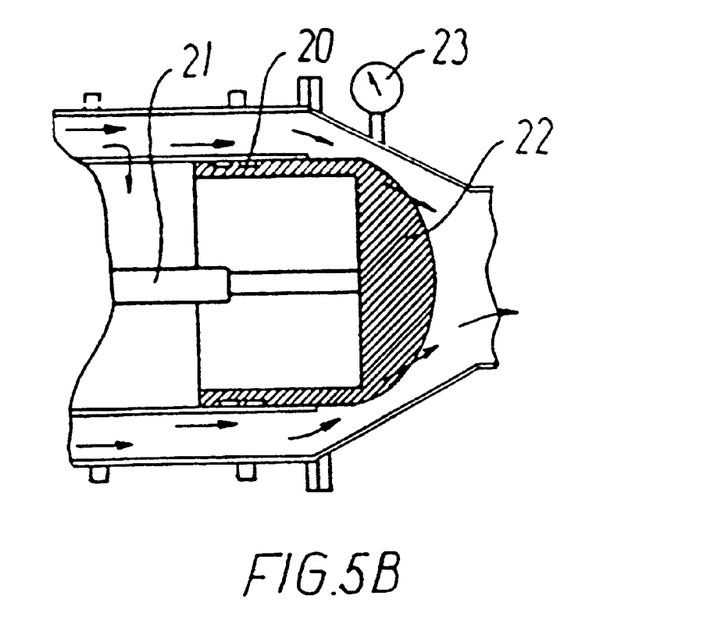

FIGS. 5a and 5b show an example of how the valve 11, which must be arranged in connection with the discharge opening 7/outlet chamber 5, and the object of which is to regulate both the pressure and flow and herewith also the relevant draining time, can be configured. In the example, the valve 11 is configured with a pneumatically or hydraulically operated piston 21 with a piston pad 22 mounted at its one end. This lies in the actual outlet opening, and by feeding the piston more or less forwards, passage between the surfaces of the piston pad and the walls of the outlet opening can regulate the flow and herewith also the pressure which is built up. Guiding is effected by means of guide rings 20. FIG. 5b shows the piston pad 22 fed forwards, and how the outlet area is thus considerably reduced, whereby the pressure in the moisture reduction press increases, and whereby the draining time is regulated.

Figure 6:
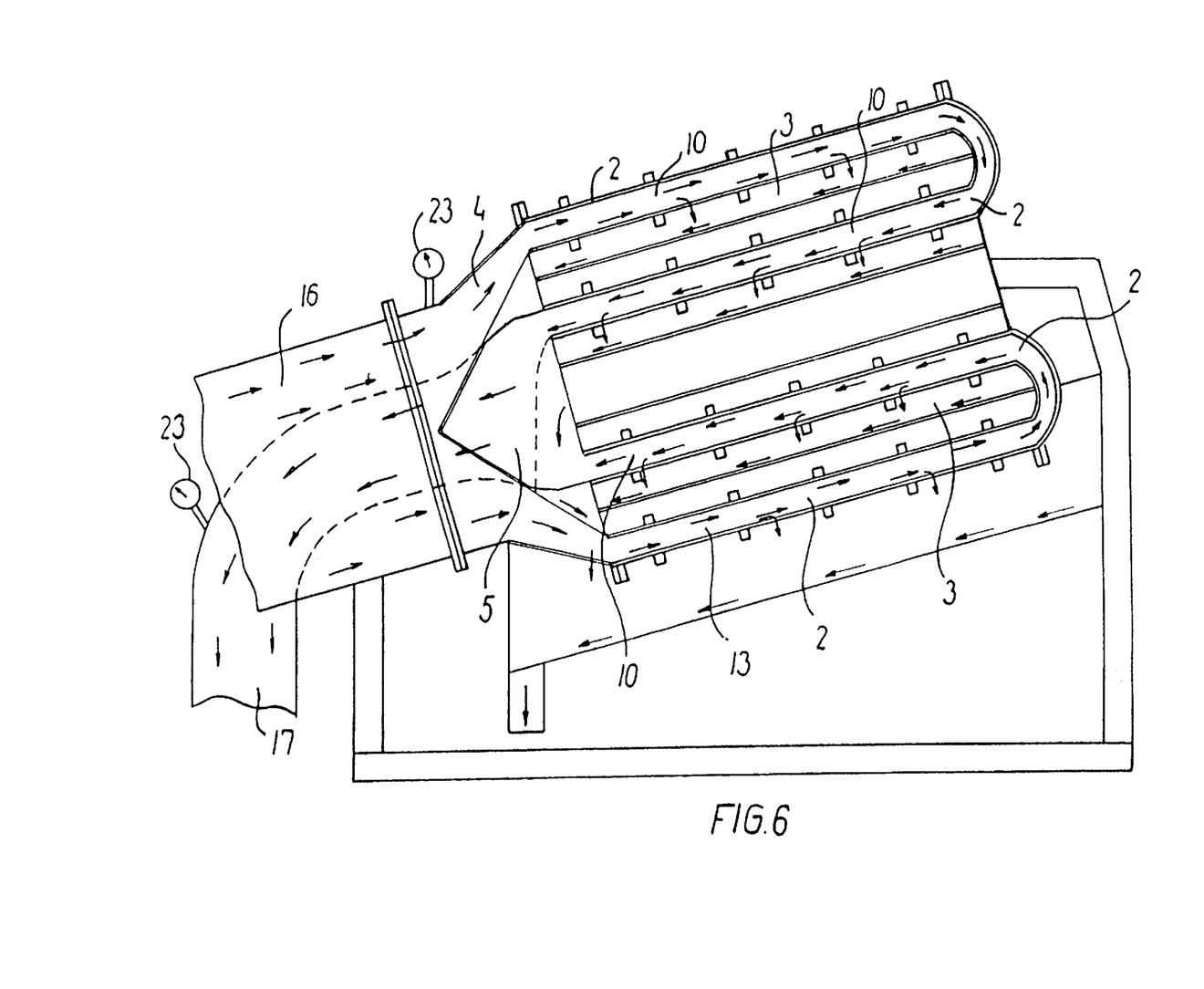
FIG. 6 shows a second example of a moisture reduction press according to the invention.
Figure 7:
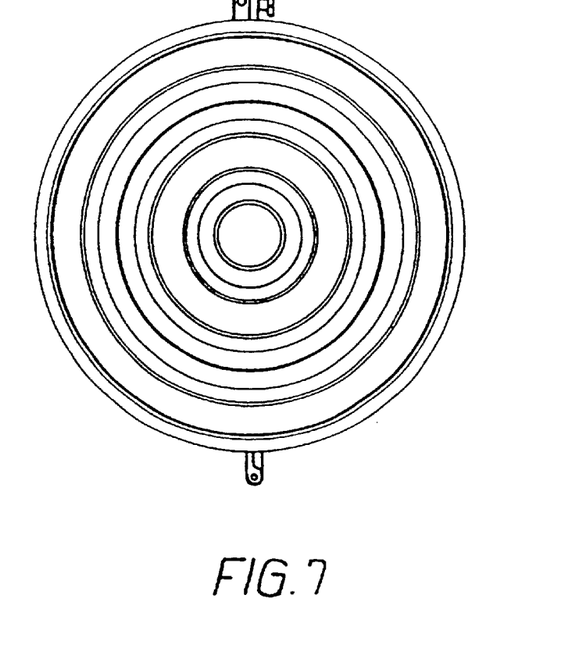
FIG. 7 shows a cross-section of the construction shown in FIG. 6.

FIGS. 6 and 7 show a final example embodiment of a moisture reduction press 1. In principle, this moisture reduction press 1 is built up as a heat exchanger, in that it consists of a first container 2 which bends 180°, and in which the second container 3 is inserted between the resulting first and second parallel-extending pipes. In this case the moisture reduction press can be configured with several first and second containers, but where the outlet for the substance has the same discharge opening 7. In principle, a collection of the drained liquid takes place as disclosed earlier. Also in this case, a pumping of the substance inside the first container 2 is effected, and where there is an annular passageway 10 as a consequence of the second container 3 being disposed with its axis coincident with the symmetrical axis of the first container 2, around which lie the resulting pipes. Also in this case there is provided a valve/throttle for the regulation of the pressure in the press. Several of said constructions can thus be arranged together, but where all of them open out into the same discharge chamber. In cross-section, the construction appears cylindrical.

The moisture reduction press is intended to be used for the draining of fish meal, meat and bone meal, fish offal and poultry offal. Because of its fat content, fish offal and poultry offal can be problematic to drain with the known moisture reduction presses. This problem is rectified with the present invention. Finally, the moisture reduction press can also be used for the handling of sludge and other material which can assume some form of liquid state under the influence of pressure.

The material which is to be pressed thus does not need to be put through a sieve before it goes into the press. The capacity and pressure can very easily be controlled. Moreover, the moisture reduction press according to the invention has a large draining area in relation to its size, and it is easy to dismantle for cleaning due to the possibility of being able to separate both the first and second container into an upper and lower container. The sieves can be held clean by means of worm blading or scrapers. Furthermore, the cost of production and use of the machine is particularly low. The thickness of the press cake is naturally a function of the dimensions of the annular passageway 10, but typically lies in the order of 40–80 mm. The pressure which can be worked with is high in relation to the existing systems, in that this can be taken right up to 20–30 bar.

The moisture reduction press, or at least that part which extends after the inlet chamber and before the outlet chamber, can be surrounded by a tight jacket to which an underpressure is applied. It is hereby achieved that the draining process is accelerated/optimized at the same time that the temperature increases. The result of the latter is that the draining process is further accelerated, e.g. when draining boiled fish and the like.

What is claimed is:

1. Moisture reduction press for the draining-off of liquid from substances, comprising a first container, said first container having an inlet opening, an inlet chamber in the first container downstream of the inlet opening, a filter area in the inlet chamber, said filter area being spaced from said first container and said filter area being defined by an outer surface, an outlet chamber in the first container downstream of the inlet chamber and an outlet opening leading from the outlet chamber, the inlet and outlet chambers being in fluid communication, the inlet opening being a position where the substances are added under pressure to the inlet chamber from where the substances are pressed through the filter area to the outlet chamber and the outlet opening, through which liquid reduced drained substance leaves the press, and including a pump which is located upstream of the filter area and a valve/throttle located at the outlet opening, necessary pressure in the press being obtained by means of said pump in combination with said valve/throttle, the press having a substantially constant cross-sectional area of passage for the substance through the press, wherein a scraper arrangement is disposed between said outer surface of the filter area and an inner surface of the first container, the scraper arrangement having scraping being fastened to the inner surface of the first container, said first container being rotatable.

2. The moisture reduction press according to claim 1, wherein the scraper arrangement in the area of passage, the scraper arrangement having scraping elements being movable in relation to at least one of first container and the filter area.

3. Moisture reduction press according to claim 1, in which the scraper arrangement fastened to the outer surface of the filer area, includes further scraping elements and wherein said filter area is rotatable.

4. Moisture reduction press according to claim 1, in which the scraper arrangement is rotatable with scraper surfaces against both the inner surface of the first container and the outer surface of the filter area.

5. Moisture reduction press according to claim 1, in which the scraper arrangement comprises a worm blading located around the outer surface of the filter area.

6. Moisture reduction press according to claim 1, in which the scraper arrangement comprises separate plate pieces mounted on at least one of the outer surface of the filter area and the inner surface of the first container.

7. Moisture reduction press according to claim 1, surrounded, at least in the area after the inlet chamber and before the outlet chamber, with a tight jacket.

8. Method for draining and pressing of a substance, including a moisture reduction press comprising a first container having an inlet opening, an inlet chamber in the first container downstream of the inlet opening, a filter area in the inlet chamber, said filter area being spaced from said first container and said filter area being defined by an outer surface, an outlet chamber in the first container downstream of the inlet chamber and an outlet opening leading from the outlet chamber, the inlet and outlet chambers being in fluid communication, the inlet opening being a position where the substances are added under pressure to the inlet chamber from where the substances are pressed through the filter area to the outlet chamber and the outlet opening, through which liquid reduced drained substance leaves the press, and including a pump which is located upstream of the filter area and a valve/throttle located at the outlet opening, necessary pressure in the press being obtained by means of said pump in combination with said valve/throttle, the press having a substantially constant cross-sectional area of passage for the substance through the press, wherein a scraper arrangement is disposed between said outer surface of the filter area and an inner surface of the first container, the scraper arrangement having scraping elements being fastened to the inner surface of the first container, said first container being rotatable, the method comprising the steps of

- leading the substance towards the first container and distributing the substance under the influence of pressure,
- adjusting the valve/throttle for establishing a desired pressure obtained by means of said pump measured in the moisture reduction press,
- periodically opening and closing the valve/throttle for producing a constant pulsation,
- draining the substance of moisture through the filter area under the influence of pressure,
- and removing the substance from the container through the outlet opening.

\* \* \* \* \*